US007260568B2

(12) United States Patent
Zhang et al.

(10) Patent No.: US 7,260,568 B2
(45) Date of Patent: Aug. 21, 2007

(54) VERIFYING RELEVANCE BETWEEN KEYWORDS AND WEB SITE CONTENTS

(75) Inventors: Benyu Zhang, Beijing (CN); Hua-Jun Zeng, Beijing (CN); Zheng Chen, Beijing (CN); Wei-Ying Ma, Beijing (CN); Li Li, Kirkland, WA (US); Ying Li, Bellevue, WA (US); Tarek Najm, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 381 days.

(21) Appl. No.: 10/826,162

(22) Filed: Apr. 15, 2004

(65) Prior Publication Data

US 2005/0234953 A1 Oct. 20, 2005

(51) Int. Cl.
*G06F 17/30* (2006.01)

(52) U.S. Cl. .................................. 707/3; 707/4; 707/5

(58) Field of Classification Search ............. 707/1–10, 707/100–104.1, 200–206; 382/218, 220, 382/225

See application file for complete search history.

(56) References Cited

U.S. PATENT DOCUMENTS 5,297,042 A 3/1994 Morita
5,418,948 A 5/1995 Turtle
5,488,725 A 1/1996 Turtle et al.
5,694,592 A 12/1997 Driscoll
5,812,134 A 9/1998 Pooser et al.
5,845,278 A 12/1998 Kirsch et al.
5,987,460 A 11/1999 Niwa et al.
6,003,027 A * 12/1999 Prager ........................... 707/5
6,112,202 A 8/2000 Kleinberg
6,167,398 A * 12/2000 Wyard et al. .................. 707/5
6,169,986 B1 1/2001 Bowman et al.
6,470,307 B1 10/2002 Turney
6,556,983 B1 4/2003 Altschuler et al.
6,560,600 B1 5/2003 Broder (Continued)

FOREIGN PATENT DOCUMENTS

DE 10029644 1/2002

(Continued)

OTHER PUBLICATIONS

Sharon McDonald et al., Evaluating a Content Based Image Retrieval System, 2001, ACM, 232-240.*

(Continued)

*Primary Examiner*—Jean Bolte Fleurantin
(74) *Attorney, Agent, or Firm*—Lee & Hayes, PLLC

(57) ABSTRACT

Systems and methods for verifying relevance between terms and Web site contents are described. In one aspect, site contents from a bid URL are retrieved. Expanded term(s) semantically and/or contextually related to bid term(s) are calculated. Content similarity and expanded similarity measurements are calculated from respective combinations of the bid term(s), the site contents, and the expanded terms. Category similarity measurements between the expanded terms and the site contents are determined in view of a trained similarity classifier. The trained similarity classifier having been trained from mined web site content associated with directory data. A confidence value providing an objective measure of relevance between the bid term(s) and the site contents is determined from the content, expanded, and category similarity measurements evaluating the multiple similarity scores in view of a trained relevance classifier model.

41 Claims, 4 Drawing Sheets

U.S. PATENT DOCUMENTS

| | | | |
|---|---|---|---|
| 6,615,209 | B1 | 9/2003 | Gomes et al. |
| 6,711,585 | B1 | 3/2004 | Copperman et al. |
| 6,742,003 | B2 | 5/2004 | Heckerman et al. |
| 6,760,714 | B1 | 7/2004 | Caid et al. |
| 6,892,193 | B2 | 5/2005 | Bolle et al. |
| 2002/0015366 | A1 | 2/2002 | Sawano |
| 2002/0178153 | A1 | 11/2002 | Nishioka et al. |
| 2003/0046389 | A1 | 3/2003 | Thieme |
| 2003/0065632 | A1 | 4/2003 | Hubey |
| 2003/0110181 | A1 | 6/2003 | Schuetze et al. |
| 2003/0208482 | A1 | 11/2003 | Kim et al. |
| 2003/0226100 | A1 | 12/2003 | Farahat et al. |
| 2003/0233370 | A1 | 12/2003 | Barabas et al. |
| 2004/0010331 | A1 | 1/2004 | Terada et al. |
| 2005/0015366 | A1 | 1/2005 | Carrasco et al. |
| 2005/0097188 | A1 | 5/2005 | Fish |
| 2005/0216443 | A1 | 9/2005 | Morton et al. |

FOREIGN PATENT DOCUMENTS

| | | |
|---|---|---|
| EP | 1320042 | 6/2003 |
| EP | 0809197 | 2/2004 |
| WO | WO97/49048 | 12/1997 |
| WO | WO99/48028 | 9/1999 |

OTHER PUBLICATIONS

Jespersen et al., Evaluating the Markov Assumption for Web Usage Mining, Nov. 7-8, 2003, ACM, 82-89.*

D. Jimenez et al., The influence of sementics in IR using LSI and K-means clustering techniques, 2003, ACM, 279-284.*

Chakrabarti S."Data Mining for Hypertext: A tutorial survey" SIGKDD Explorations vol. 1 issue 2, Jan. 2000, 11 pages.

Cohn et al.; "The Missing Link—A Probabilistic Model of Document Content and Hypertext Connectivity" Proceedings of Neural Information Processing Systems, 2001, 7 pages.

Dhillon et al.; "Efficient Clustering of Very Large Document Collections" Data Mining,for Scientific and Engineering Applications, Chapter 1, Kluwer Academic Publishers, 2001, pp. 1-25.

Liu et al.; "Clustering Through Decision Tree Construction" 9th International Conference on Information and Knowledge Management, 2000, 10 pages.

Kleinberg J.M.; "Authoritative Sources in a Hyperlinked Environment " Proceedings of the ACM-SIAM Symposium on Discrete Algorithms, 1998, 34 pages.

Heer et al.; "Identification of Web User Traffic Composistion using Multi-Model Clustering and Information Scent" 1st SIAM ICDM Workshop on Web Mining. Chicago 2001. 13 pages.

Gibson et al.; "Inferring Web Communities from Link Topology" Proceedings of the 9th ACM Conference on Hypertext and Hypermedia, 1998, 17 pages.

Neville et al; "Iterative Classification in Relational Date" Proceedings AAAI-2000 Workshop on Learning Statistical Models form Relational Data, AAAI Press 2000, pp. 42-49.

Steinbach et al.; "A Comparison of Document Clustering Techniques" 6th ACM SIGKDD World Text Mining Conference Boston, 2000, 2 pages.

Su et al.; "Correlation-based Document Clustering using Web Logs" Proceedings of the 34th Hawaii International Conference on System Sciences, 2001, 7 pages.

Taskar et al.; "Probabilistic Classification and Clustering in Relational Data" Proceedings of the 34th Hawaii International Conference on System Sciences. 2001. 7 pages.

Unger et al.; "Clustering Methods for Collaborative Filtering" In Workshop on Recommendation System at the 15th National Conference on Artifical Intelligence, 1998, 16 pages.

Wen et al.; "Query Clustering Using User Logs" ACM Transactions on Information Systems vol. 20 No. 1; Jan. 2002, pp. 59-81.

Zeng et al; "A Unified Framework for Clustering Heterogeneous Web Objects" Proceedings of the 3rd international Conference of Web Information System Engineering, Singapore 2002, 10 pages.

"Open Directory Project" http://dmoz.org/ Netscape 1998-2004 1 page.

Berkhin P.; "Survey of Clustering Data Mining Techniques" Accrue Software Inc.; 2002 pp. 1-56.

Yang et al.; "A Comparative Study on Feature Selection in Text Categorization" Proceedings of the Fourteenth International Conference on Machine Learning, Morgan Kaufmann Publishers Inc., San Francisco 1997, pp. 412-420.

Slattery S. et al.; "Combining Statistical and Relational Methods for Learning in Hypertext Domains" Lecture Notes in Computer Science, 1998, pp. 38-52.

Kim et al, "A Comparison of Collocation-Based Similarity Measures in Query Expansion", Information Processing & Management, Elsevier Science Ltd, vol. 35, No. 1, Jan. 1999 pp. 19-30.

Qiu et al, "Concept Based Query Expansion", SIGIR Forum, Association for Computing Machinery, New York, Jun. 27, 1993, pp. 160-169.

Raghavan et al, "On the Reuser of Past Optimal Queries", SIGIR '95, Proceedings of the 18th Annual International ACM SIGIR Conference on Research and Development in Information Retrieval, Jul. 9, 1995, pp. 344-350.

Beeferman D. & Berger A. "Agglomerative clustering of a search engine query log" Proceedings of the ACM SIGKDD. International cnference on Knowledge Discovery and Data Mining, ACM, US, 2000, pp. 407-416, XP002339640.

Srivastava et al. "Discovery and Applications of Usage Patterns from Web Data" Sigkdd Explorations, Jan. 2000 (2000-20001), pp. 12-23, XPoo2241892 *the whole document*.

Attardi, G. et al.: "Automatic web Page Categorization by Link and context Analysis" Proceedings of THIA, European Symposium on Intelligence, 1999. *the whole document*.

Brin S et al: "The anatomy of a large-scale hypertextual web search engine" Computer Networks and ISDN Systems, North Holland Publishing. Amsterdem, NL, vol. 30, No. 1-7, Apr. 1998, pp. 107-117.

Harmandas, V. et al. "Image Retrieval by Hypertext Links" Association For Computing Machinery. Proceedings of the 20th Annual INternational ACM-SIFIR Conference on Research and Development in INformation Retrieval. Philadelphia, PA, Jul. 27-31, 1997, pp. 296-303.

Smith, J.R. et al.: "An Image and Video Search Engine for the World-Wide Web" Storage and retrieval for image and video databases 5. San Jose, Feb. 13-14, 1997, Proceedings of SPIE, Bellingham, SpIE, US, vol. 3022, pp. 84-95.

Westerveld, T. et al: "Retriving Web Pages using Content, Links, URLs and Anchors" Test Retrieval Conference. Proceedings, XX, XX, Nov. 13, 2001,pp. 663-672.

Boyan et al., "A Machine Learning Architecture for Optimizing Web Search Engines", AAAI Workshop on Internet-Based Information Systems, 1996, pp. 1-8, Retrieved from the Internet http://www.cs.cornell.edu/People/tj/publications/boyan_etal_96a.pdf.

Frei et al., "The Use of Semantic Links in Hypertext Information Retrieval" Information Processing & Management, Elsevier, Barking, GB, vol. 31, No. 1, Jan. 2, 1995, pp. 1-13.

Li, "Toward a Qualitive Search Engine" Internet Computing, IEEE, vol. 2, No. 4, Jul. 1998, pp. 24-29, Retrieved from the Internet at http://ieeexplore.ieee.org/xpl/abs_free.jsp?arNumber=707687.

Marchioro, Massimo, "The Quest for Correct Information on the Web: Hyper Search Engines" Computer Networks and ISDN Systems, North Holland Publishing, Amsterdam, NL, vol. 29, No. 8-13, Sep. 1997, pp. 1225-1235.

Kim et al., "A Comparison of Collocation-Based Similarity Measures in Query Expansion", Inform ation Processing and Management Elsevier, Garking, GB, vol. 35, No. 1, Jan. 1999, pp. 19-30.

Shaw, Term-Relevance Computautions and Perfect Retrieval Performance Information Processing and Management, Elsevier, Barking, GB, vol. 31, No. 4, Jul. 1995, pp. 491-498.

EPO Communication with Search Report dated Oct. 4, 2006, from counterpart EP patent application, European Patent Application No. 05102952.8, copy attached, 3 pages.

Huaizhong et al., Similarity Model and Term Association For Document Catergorization, Sep. 2-6, 2002, pp. 256-260.

Yeung et al., "Improving Performance of Similarity-Based Clustering by Feature Weight Learning," Apr. 2002, vol. 24, Issue 4, pp. 556-561.

* cited by examiner

VERIFYING RELEVANCE BETWEEN KEYWORDS AND WEB SITE CONTENTS

RELATED APPLICATIONS

This patent application is related to the following patent applications, each of which are commonly assigned to assignee of this application, and hereby incorporated by reference:

"Related Term Suggestion for Multi-Sense Query", filed on Apr. 15, 2004;

U.S. patent application Ser. No. 10/826,159, titled "Reinforced Clustering of Multi-Type Data Objects for Search Term Suggestion", filed on Apr. 15,2004; and U.S. patent application Ser. No. 10/427,548, titled "Object Clustering Using Inter-Layer Links", filed on May 1, 2003.

TECHNICAL FIELD

Systems and methods of the invention pertain to data mining.

BACKGROUND

A keyword or keyphrase is a word or set of terms submitted by a Web surfer to a search engine when searching for a related Web page/site on the World Wide Web (WWW). Search engines determine the relevancy of a Web site based on the keywords and keyword phrases that appear on the page/site. Since a significant percentage of Web site traffic results from use of search engines, Web site promoters know that proper keyword(s) selection is vital to increasing site traffic to obtain desired site exposure. Techniques to identify keywords relevant to a Web site for search engine result optimization include, for example, evaluation by a human being of Web site content and purpose to identify relevant keyword(s). This evaluation may include the use of a keyword popularity tool. Such tools determine how many people submitted a particular keyword or phrase including the keyword to a search engine. Keywords relevant to the Web site and determined to be used more often in generating search queries are generally selected for search engine result optimization with respect to the Web site.

After identifying a set of keywords for search engine result optimization of the Web site, a promoter may desire to advance a Web site to a higher position in the search engine's results (as compared to displayed positions of other Web site search engine results). To this end, the promoter bids on the keyword(s) to use with specific URL(s), wherein the bidding indicates how much the promoter will pay each time a Web surfer clicks on the promoter's listings associated with the keyword(s). In other words, keyword bids are pay-per-click bids for specific URL (Web site) promotion. The larger the amount of the keyword bid as compared to other bids for the same keyword, the higher (more prominently with respect to significance) the search engine will display the associated Web site in search results based on the keyword. Unfortunately, advertiser bidding terms may not be relevant to the Web site contents and, as a result, may not match the terms or language used by an end-user.

It may appear that the simplest way to verify a keyword(s) against a Web site (i.e., Web site content) is to use a conventional retrieval approach, which measures the similarity only between the keyword(s) and the Web site, without any additional data point comparisons. However, this technique is substantially limited. Even though the keyword(s) may be related to the Web site, the Web site itself may not include threshold criteria (e.g., direct match, number of occurrences, etc.) supporting the desired keyword(s), causing rejection of a potentially valuable bidding term. For example, consider that an online shopping corporation with an associated Web site bids on the phrase "online shopping". If the conventional retrieval approach is used and a relatively small number of occurrences of the keyword "shopping" and no occurrence of keyword "online" are found in the Web site, the potentially valuable keyphrase of "online shopping" may be mistakenly disqualified as a bidding term.

Another conventional technique is to classify a submitted bid term/phrase and Web site to obtain two categories probabilities vectors, which are then combined into a final relevance score. The problem with this conventional technique is that it does not evaluate the term/phrase directly against his website, which can be substantially problematic. For example, if an advertiser bids on the term "Italian shoes", and his website sells shoes but NOT Italian shoes, the conventional classification technique will indicate to the advertiser that the bid phrase of "Italian shoes" is irrelevant to the Web site.

In view of the above, systems and methods to better identify keywords relevant to Web site content would be welcomed by Web site promoters. This would allow the promoters to bid terms more likely to be used by an end-user. Ideally, these systems and methods would be independent of the need for a human being to evaluate Web site content to identify relevant keywords for search engine optimization and keyword bidding.

SUMMARY

Systems and methods for verifying relevance between terms and Web site contents are described. In one aspect, site contents from a bid URL are retrieved. Expanded term(s) semantically and/or contextually related to bid term(s) are calculated. Content similarity and expanded similarity measurements are calculated from respective combinations of the bid term(s), the site contents, and the expanded terms. Category similarity measurements between the expanded terms and the site contents are determined in view of a trained similarity classifier. The trained similarity classifier having been trained from mined web site content associated with directory data. A confidence value providing an objective measure of relevance between the bid term(s) and the site contents is determined from the content, expanded, and category similarity measurements evaluating the multiple similarity scores in view of a trained relevance classifier model.

BRIEF DESCRIPTION OF THE DRAWINGS

In the figures, the left-most digit of a component reference number identifies the particular figure in which the component first appears.

FIG. 3 is a continuation of the exemplary operations of FIG. 2.

DETAILED DESCRIPTION

Overview

Figure 1:
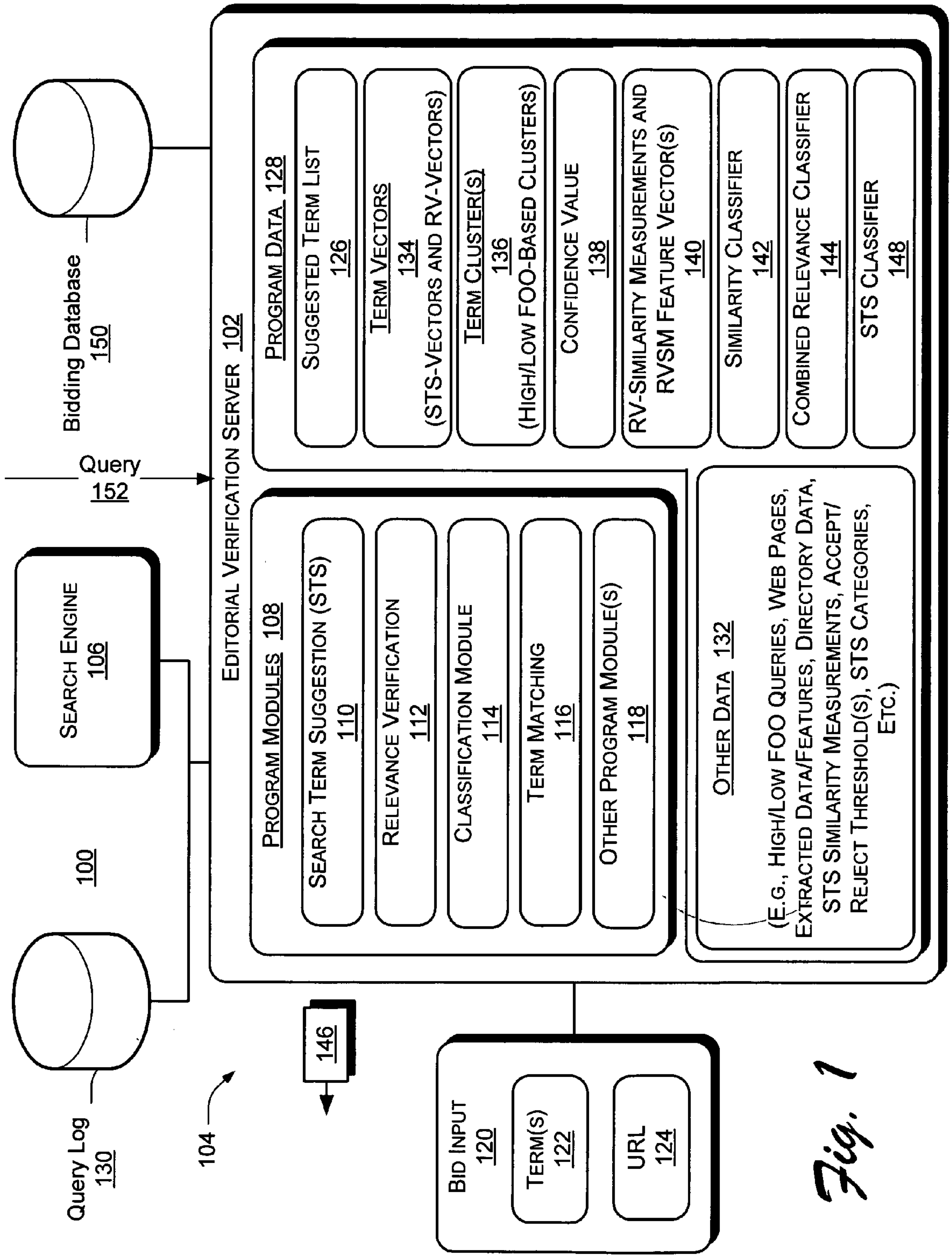
FIG. 1 illustrates an exemplary system for verifying relevance between terms and Web site contents.

The following systems and methods verify relevance between terms and Web site contents to address the limitations of conventional term qualification techniques. To this end, the systems and methods combine multiple similarity measurements via trained classifier models to provide a single confidence value indicating whether bid term(s) is/are relevant to a particular Web site's content. More particularly, and in this implementation, the multiple similarity measurements include content, category, and proper name similarity scores.

Content similarity scores include direct and expanded content similarity. Direct content similarity is determined by evaluating vector models of the bid term(s) and site contents of the submitted Web site. Expanded similarity is determined by evaluating similarity between vector models of expanded terms and the site contents. The expanded terms are mined from a search engine in view of high-frequency of occurrence historical query terms, and determined to be semantically and/or contextually similar to the bid term(s). Category similarity is determined by applying a trained similarity categorization (classifier) model to the expanded terms and Web site contents to determine relatedness of categories between these inputs. Proper name similarity is determined by evaluating the bid term(s) and Web site contents in view of a database of proper names. These multiple similarity measurements are combined using a combined relevance classifier model that is trained to generate a single relevance confidence value from these score in view of an accept/reject threshold. The confidence value provides an objective measurement of the relevance of the bid term(s) to the Web site in view of these multiple different similarity measurements.

These and other aspects of the systems and methods for verifying relevance between terms and Web site contents are now described in greater detail.

An Exemplary System for Editorial Verification

Turning to the drawings, wherein like reference numerals refer to like elements, the systems and methods for verifying relevance between terms and Web site contents are described and shown as being implemented in a suitable editorial verification computing environment. Although not required, the invention is described in the general context of computer-executable instructions (program modules) being executed by a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows system 100 for verifying relevance between bid terms and bid Web site contents. In this implementation, system 100 includes editorial verification server 102 coupled across a network 104 to search engine 106. Network 104 may include any combination of a local area network (LAN) and general wide area network (WAN) communication environments, such as those which are commonplace in offices, enterprise-wide computer networks, intranets, and the Internet. Editorial verification server 102 includes a number of program modules 108, for example, search term suggestion (STS) module 110, relevance verification module 112, classification module 114, term matching module 116, and other program module(s) 118 such as a Web page crawler to retrieve site contents from a bid Universal Resource Locator (URL) identifying a Web site.

An end-user (e.g., an advertiser, Web site promoter, etc.) provides bid input 120 to editorial verification server 102 for relevance verification of bid term(s) to site content of a bid URL. Bid input 120 includes bid term(s) 122 and bid URL 124. In one implementation, editorial verification server 102 includes one or more user input interfaces (e.g., see user input interfaces 460 of FIG. 4) such as a keyboard, mouse, voice recognition system, and/or the like, for the end-user to supply bid input 120 to editorial verification server 102. In another implementation, editorial verification server 102 is coupled across network 104 to a client computing device (e.g., remote computer 480 of FIG. 4) for the end-user to provide bid input 120 to editorial verification server 102.

Exemplary Search Term Suggestion

Responsive to receiving bid input 120 from an end-user, search term suggestion module 102 generates search term suggestion list 126 to expand term(s) 122 with semantically and/or contextually related terms. Multiple senses or contexts of a term 122 may provide additional term meaning, as described below. TABLE 1 shows an exemplary suggested term list 126 of terms determined to be related to a term(s) 122 of "mail." Terms related to term(s) 122 are shown in this example in column 1, titled "Suggested Term(s)".

TABLE 1

AN EXEMPLARY SUGGESTED TERM LIST FOR THE BID TERM "MAIL"

| Suggested Term(s) | Similarity | Frequency | <Context> |
|---|---|---|---|
| hotmail | 0.246942 | 93161 | online e-mail |
| yahoo | 0.0719463 | 165722 | related |
| mail.com | 0.352664 | 1455 | |
| yahoo mail | 0.0720606 | 39376 | |
| www.mail.com | 0.35367 | 711 | |
| email.com | 0.484197 | 225 | |
| www.hot | 0.186565 | 1579 | |
| www.msn.com | 0.189117 | 1069 | |
| mail.yahoo.com | 0.0968248 | 4481 | |
| free email | 0.132611 | 1189 | |
| www.aolmail.com | 0.150844 | 654 | |
| check mail | 0.221989 | 66 | |
| check email | 0.184565 | 59 | |
| msn passport | 0.12222 | 55 | |
| www.webmail.aol.com | 0.0800538 | 108 | |
| webmail.yahoo.com | 0.08789 | 71 | |
| free email account | 0.0836481 | 65 | |
| mail | 1 | 2191 | Traditional mail |
| usps | 0.205141 | 4316 | related |
| usps.com | 0.173754 | 779 | |
| united parcel service | 0.120837 | 941 | |
| postal rates | 0.250423 | 76 | |
| stamps | 0.156702 | 202 | |
| stamp collecting | 0.143618 | 152 | |
| state abbreviations | 0.104614 | 300 | |
| postal | 0.185255 | 66 | |
| postage | 0.180112 | 55 | |
| postage rates | 0.172722 | 51 | |
| usps zip codes | 0.136821 | 78 | |
| us postmaster | 0.109844 | 58 | |

Referring to TABLE 1, note that for each suggested term (col. 1), search term suggestion list 126 also includes a respective similarity measurement value (see, col. 2) to indicate relatedness between the suggested term(s) and term(s) 122, and a respective frequency of use score (see, col. 3) to provide an indication of how frequently the suggested term(s) of col. 1 has/have been submitted to the search engine 106. In this example, each similarity value of col. 2 provides a similarity measure or score between a corresponding suggested term (col. 1) and bid term(s) 122, which is "mail" in this example. Each frequency value, or score, indicates the number of times that the suggested term was used by a particular search engine 106 in an end-user search query. If to be presented to an end-user, the suggested term list 126 is sorted as a function of business goals, for instance by suggested term(s), similarity, and/or frequency scores.

Any given term(s) 122 (e.g., mail, etc.) may have more than a single context within which the bid term may be used. To account for this, search term suggestion module 110 segregates suggested term(s) by context. For example, referring to TABLE 1, the term(s) 122 of "mail" has two (2) contexts: (1) traditional off-line mail and (2) online e-mail. Note that a respective (segregated or independent) list of suggested term(s) is shown for each of these two bid term contexts.

Suggested term(s) of suggested term list 126 may be more than synonyms of term(s) 122. For instance, referring to TABLE 1, a suggested term of "usps" is an acronym for an organization that handles mail, not a synonym for a bid term of "mail." However, "usps" is also a term very contextually related to a "mail" bid term, and thus, is shown in the suggested term list 126. In one implementation, search term suggestion module 110 determines the relationship between a related term R (e.g. "usps") and a target term T (e.g. "mail") as a function of the following association rule: itr(T)→itr(R), wherein "itr" represents "interested in". That is, if an end-user (advertiser, Web site promoter, and/or the like) is interested in R, then the end-user will likely also be interested in T.

To generate search term suggestion list 126, search term suggestion module 110 submits select ones of historical queries mined from query log 130 to search engine 106. The select ones of the historical queries for submission to search engine 105 identified by search term suggestion module 126 as having a substantially high frequency of occurrence (FOO) as compared to other ones of the historical query terms mined from query log 130. In this implementation, a configurable threshold value is used to determine whether a historical query has a relatively higher or low frequency of occurrence. For example, historical query terms that occur at least a threshold number of times are said to have a high frequency of occurrence. Analogously, historical query terms that occur less than the threshold number of time are said to have a low frequency of occurrence. For purposes of illustration, such a threshold value is shown as a respective portion of "other data" 132. High and low FOO query terms are shown as "high/low FOO queries" portion of "other data" 132.

Search term suggestion module 110 extracts a set of features or snippet descriptions from select ones of the returned search results (e.g., one or more top-ranked search results) for each query term. Search term suggestion module 110 performs text preprocessing operations on the extracted data to generate individual term tokens. To reduce dimensionality of the tokens, search term suggestion module 110 removes any stop-words (e.g., "the", "a", "is", etc.) and removes common suffixes, and thereby normalizes the terms, for example, using a known Porter stemming algorithm. Search term suggestion module 110 arranges the resulting terms and other extracted features into one or more search term suggestion (STS) vectors (shown as a respective portion of term vectors 134). Each STS vector 134 has dimensions based on term frequency and inverted document frequency (TFIDF) scores.

A weight for the $i^{th}$ vector's $j^{th}$ term is calculated as follows:

$$w_{ij}=TF_{ij}x\ \log(N/DF_j)$$

wherein $TF_{ij}$ represents term frequency (the number of occurrences of term j in the $i^{th}$ record), N is the total number of query terms, and $DF_j$ is the number of records that contain term j. Search term suggestion module 110 uses these respective weights to group similar terms and context from STS vectors 134 to generate term clusters 136. To this end, and in this implementation, given the vector representation of each term, a cosine function is used to measure the similarity between a pair of terms (recall that the terms were normalized):

$$sim(q_j, q_k) = \sum_{i=1}^{d} w_{ij} \cdot w_{ik}$$

Thus, the distance between the two terms (a similarity measurement) is defined as:

$$dist(q_j,q_k)=1-sim(q_j,q_k)$$

Such search term suggestion (STS) similarity measurements are shown as a respective portion of "other data" 132. Exemplary such similarity values are shown above in an exemplary suggested term list 126 of TABLE 1.

Search term suggestion module 110 uses the calculated term similarity measurement(s) to cluster/group terms in the STS vectors 134 into a high FOO historical query term based portion of term cluster(s) 136. More particularly, and in this implementation, search term suggestion module 110 uses a known density-based clustering algorithm (DBSCAN) to generate these term cluster(s) 136. DBSCAN uses two parameters: Eps and MinPts. Eps represents a maximum distance between points in a term cluster 136. A point is a feature vector of a term. In a high dimensional space, vectors are equivalent to points. MinPts represents a minimum number of points in a term cluster 136. To generate a cluster 136, DBSCAN starts with an arbitrary point p and retrieves all points density-reachable from p with respect to Eps and MinPts. If p is a core point, this operation yields a term cluster 136 with respect to Eps and MinPts. If p is a border point, no points are density-reachable from p and DBSCAN visits the next point.

Search term suggestion module 110 then compares term(s) 122 to respective ones of the term(s) in the term clusters 136. Since the term clusters include features that are semantically and/or contextually related to one another, term(s) 122 is/are evaluated in view of multiple related contexts, or "senses" to expand term(s) 122, and thereby provide generate search term suggestion list 126. In one implementation, if search term suggestion module 110 determines that term(s) 122 match term(s) from no more than a single cluster 136, search term suggestion module 110 generates suggested term list 126 from the single cluster 136. In this implementation, a match may be an exact match or a match with a small number of variations such as singular/plural forms, misspellings, punctuation marks, etc. The generated term list is ordered by a certain criteria, which, for example, could be a linear combination of the FOO and the similarity between term(s) 122 and the suggested terms, as:

$$Score(q_i)=\alpha FOO(q_i)+\beta sim(q_i,Q)$$

where $\alpha+\beta=1$.

If search term suggestion module 110 determines that term(s) 122 match term(s) in multiple term clusters 136, search term suggestion module 110 generates suggested term list 126 from terms of the multiple term clusters. The suggested terms from each clusters are ordered using the same method as described above in paragraph no.

An exemplary system and method for search term suggestion module 110 to generate search term suggestion list 126 is described in U.S. patent application Ser. No. pending U.S. patent application Ser. No. 10.825, 894 titled, titled "Related Term Suggestion for Multi-Sense Query", filed on Apr. 15, 2004.

Exemplary Relevance Verification

Relevance verification module 112 uses the suggested term(s) (terms that expand bid input 120 terms(s) 122) of search term suggestion list 126 and bid input 120 (i.e., term(s) 122 and site content from URL 124) to generate confidence value 138, which measures relevance between the bid term(s) 122 and site contents of the bid URL 124. To this end, relevance verification module 112 calculates confidence value 138 from multiple similarity measurements, which for purposes of illustration and discussion are shown as relevance verification (RV) similarity measurements 140. In this implementation, RV-similarity measurements 140 include, for example, content similarity, classification similarity, and proper name similarity scores. Each of these types of RV-similarity measurements 140 is now described.

Content similarity measurements portion of RV-similarity measurements 140 include direct and expanded similarity measurements. To calculate direct similarity, relevance verification module 112 measures similarity/relatedness between term(s) 122 and site contents of URL(s) 13, both being modeled in vector space. To calculate expanded similarity, site contents of URL 124 are retrieved, for example, by a Web page crawler module, which is represented by a respective portion of "other program module(s)" 118. Relevance verification module 112 determines similarity between suggested term(s) of search term suggestion list 126 and site contents of URL 124, both inputs also having been modeled in vector space. As described above, the suggested term(s) of the search term suggestion list 126 were: (a) mined from results returned by search engine 106 in view of submitted high FOO historical query terms. Thus, the suggested term(s) is/are determined to be semantically and/or contextually related to the bid term(s) 122.

The proper name similarity measurements portion of RV-similarity measurements 140 indicates similarity/relatedness between any proper name(s) detected in the bid term(s) 122 and site contents of URL 124. For purpose of discussion, a database of proper names is represented with a respective portion of "other data" 132. Such proper names include, for example, names of countries, cities and famous trademarked brands. More particularly, upon detecting any proper names in the bid input 120, relevance verification module 112 calculates proper name similarity as:

Prop_Sim(term, page)=

1—If a term contains a proper name P, and page contained a conformable proper name Q.

0—Of term contains a proper name P, and page only contains unconformable proper name(s) Q.

0.5—Otherwise.

A proper name is conformable with itself and its ancestors. For example, a low-level geographical location is conformable with a high-level geographical location which contains it, e.g. Milan is conformable with Italy.

The classification similarity measurements portion of RV-similarity measurements 140 measure relatedness between suggested term(s) of the search term suggestion list 126 and site contents of URL 124. More particularly, classification similarity measurements are generated by submitting the suggested terms and Web site contents to trained similarity classifier (categorization) 142. Relevance verification module 122 trains similarity classifier 142 with any one of a number of different classification techniques (e.g., naïve Bayesian (NB), support vector machine (SVM), statistical n-gram based naïve Bayesian (N-Gram), nearest neighbor (KNN), decision tree, co-training, boosting, and/or the like), as is now described.

Exemplary Offline Similarity Classifier Training

Relevance verification module 112 trains similarity classifier 142 as $\Phi:X\mapsto L$ on directory data (see, "other data" 132), wherein X is input (a string stream with scale from a single term to several web page contents), and L is output (a probability over all the top2 levels of categories). The category taxonomy is of hierarchical structure. In this implementation, we use the $2^{rd}$-level categories of LookSmart® directory data, the sum of these categories is some number (e.g., 74), for the classification. Relevance verification module 112 performs feature extraction and feature selection operations on the directory data. More particularly, relevance verification module 112 extracts snippet descriptions (extracted data) from Web page(s) identified by the directory data. The Web page(s) are retrieved, for example, by a Web page crawler module represented with a respective portion of "other program module(s)" 118. Each snippet description for a particular Web page includes, for example, one or more of a title, metadata, body, anchor text, font size, hyperlinks, images, raw HTML (e.g., summarization and page layout information), and/or the like.

Relevance verification module 112 applies simple text preprocessing to generate linguistic tokens (i.e., tokenizes individual terms) from the extracted features/data. To reduce dimensionality of the tokens, relevance verification module 112 removes any stop-words and removes common suffixes to normalize the terms, for example, using a known Porter stemming algorithm. Relevance verification module 112 arranges the resulting extracted features into one or more relevance verification (RV) term vectors (i.e., RV-vectors 134). As such, each Web page is represented as a feature vector, whose element is a word with its weighting $x_i=<x_{i1}, x_{i2} \ldots x_{in}>$ The weighting $x_{ij}$ is calculated by length-normalized log(tf).idf, which has the form:

$$idf_t \times \frac{1+\log(f_{d,t})}{1+\log(avef_d)} \times \frac{1}{avedlb + S \times (dlb_d - avedlb)},$$

where, d represents the original document, t represents term, $f_{x,t}$ represents frequency of term t in x, $idf_t$ represents inverse document frequency of term t, $dlb_x$ represents number of unique terms in x, $avef_x$ represents average of term frequencies in x, and avedlb represents average of $dlb_x$ in the collection.

Feature selection operations of relevance verification module 112 further reduce the features of RV-vectors 134 (too many features can degrade the performance and accuracy of a classification system). In this implementation, information gain (IG) selection method is used for feature selection. Information gain of a term measures the number of bits of information obtained for category prediction by the presence or absence of the term in a document as follows:

$$IG(t) = -\sum_{i=1}^{m} p(c_i)\log p(c_i) + p(t)\sum_{i=1}^{m} p(c_i \mid t)\log p(c_i \mid t) + p(\bar{t})\sum_{i=1}^{m} p(c_i \mid \bar{t})\log p(c_i \mid \bar{t}),$$

wherein, t represents term, c represents category, and m represents total number of categories. Other feature selection methods, such as mutual information (MI), document frequency (DF), and Linear Discriminant Analysis (LDA), can also be used.

In this implementation, relevance verification module 112 classifier training operations employ statistical n-gram model based Naïve Bayesian classifier (n-gram), although other types of classifiers could be used. In particular, different from Naïve Bayesian classifier, statistical n-gram model doesn't assume the independent of word stream. It assumes Markov n-gram independence, i.e. one word is dependent to previous n-1 words according to:

$$p(w_i \mid w_1, w_2, \ldots, w_{i-1}) = p(w_i \mid w_{i-n+1}, \ldots w_{i-1}).$$

A straightforward estimation of this probability from a training corpus is given by the observed frequency of:

$$p(w_i \mid w_{i-n+1}, \ldots, w_{i-1}) = \frac{\#(w_{i-n+1}, \ldots, w_i)}{\#(w_{i-n+1}, \ldots, w_{i-1})}.$$

Most of the $\#(w_{i-n+1}, \ldots w_i), \#(w_{i-n+1}, \ldots w_{i-1})$ values are zero in the training data. So smoothing technology is proposed to estimate the zero probability to deal with any data sparseness. Back-off n-gram model is one way to deal with this issue, as follows:

$$p(w_i \mid w_{i-n+1}, \ldots, w_{i-1}) = \begin{cases} \hat{p}(w_i \mid w_{i-n+1}, \ldots, w_{i-1}), \text{ if } \#(w_{i-n+1}, \ldots, w_i) > 0 \\ \beta(w_{i-n+1}, \ldots, w_{i-1}) \times p(w_i \mid w_{i-n+2}, \ldots, w_{i-1}), \text{ otherwise} \end{cases}$$

wherein, $$\hat{p}(w_i \mid w_{i-n+1}, \ldots, w_{i-1}) = \frac{\text{discount } \#(w_{i-n+1}, \ldots, w_i)}{\#(w_{i-n+1}, \ldots, w_{i-1})}$$

is the discounted conditional probability, and $\beta(w_{i-n+1}, \ldots w_{i-1})$ is the back-off factor to back-off n-gram to (n-1)-gram:

$$\beta(w_{i-n+1}, \ldots, w_{i-1}) = \frac{1 - \sum_{x:\#(w_{i-n+1}, \ldots, w_{i-1}, x)>0} \hat{p}(x \mid w_{i-n+1}, \ldots, w_{i-1})}{1 - \sum_{x:\#(w_{i-n+1}, \ldots, w_{i-1}, x)>0} \hat{p}(x \mid w_{i-n+2}, \ldots, w_{i-1})}.$$

There are several algorithms to calculate the discounted probability. In this implementation, "absolute smoothing" is used as follows:

$$\hat{p}(w_i \mid w_{i-n+1}, \ldots, w_{i-1}) = \frac{\#(w_{i-n+1}, \ldots, w_i) - b}{\#(w_{i-n+1}, \ldots, w_{i-1})}$$

where $$b = \frac{n_1}{n_1 + 2n_2}, \text{ and } n_i$$

is the number of words which occur exactly i times in training data. Thus, we can modify the NB classifier as n-gram classifier:

$$c_{n\text{-}gram} = \arg\max_{c_j \in V} p(c_j) \prod_i p_{c_j}(w_i \mid w_{i-n+1}, \ldots, w_{i-1})$$

In this implementation, n=3, and the n-gram classifier is called the 3-gram classifier.

Expert Combination of Similarity Measurements

Relevance verification module 112 evaluates the multiple RV-similarity measurements 140 in view of combined relevance classifier 144 to generate confidence value 138, which indicates an objective relevance of the bid term(s) 122 to site content of bid URL 124. Combined relevance classifier 144 is trained with supervised learning, for example, as an SVM classifier, with data in the form of <term(s), Web page (URL), Accept/Reject> in view of a reject/accept term/phrase threshold. For purposes of discussion, a reject/accept term threshold is shown as a respective portion of "other data" 132.

RV-similarity measurements 140 are treated as a feature vector for bid input 120 (i.e., a <term, page> pair). For purposes of illustration and discussion, RV-similarity measurements (SM) as feature vector(s) are shown as RVSM feature vector(s) 140. We have the following bid input 120 and RV-similarity measurement 140 calculations:

bid input 120: <term(s) 122, URL 124>;

content based RV-similarity measurements 140 of term(s) 122, URL 124, which is represented as Sim(term(s) 122, URL 124);

expanded content based RV-similarity measurements 140—Ex_Sim(expanded term(s) 126, URL 124);

similarity classifier 142 based RV-similarity measurements 140—Cate_Sim(category of expanded terms 126, category of URL); and proper name based RV similarity measurements 140—Proper_Sim(proper names, term(s) 122, URL 124).

Relevance verification module 112 applies RVSM feature vector(s) 140 of <term, query> to combined relevance classifier 144 to map the multiple RV-similarity values 140 in view of the reject/accept relevance threshold to calculate respective RV-similarity type weights (i.e., content, expanded, category, and proper similarity measurement types) and the final confidence value 138.

Classification of Low FOO Terms

In view of a configurable threshold, if confidence value 138 indicates that term(s) 122 should be rejected as irrelevant to site contents of URL 124, classification module 114 generates suggested term list 126 based on low frequency of occurrence (FOO) query terms for the end-user to evaluate in view of the site contents of URL 124. In this implementation, the suggested term list 126 is shown as message 146 being communicated to an end-user for evaluation. In particular, classification module 114 uses STS classifier 148 from term clusters 136, which as described above, were generated from high frequency of occurrence (FOO) query log terms. Classification module 114 uses STS classifier 148 to group the high FOO-based term clusters 136 into one or more STS categories (see, "other data" 132) as a function on their respective term content. Term clusters 136 are already in a vector space model suitable for classification operations. Additionally, stop-word removal and word stemming (suffix removal) has already reduced dimensionality of term cluster 136 content. In one implementation, additional dimensionality reduction techniques, for example, feature selection or re-parameterization, may be employed.

In this implementation, to classify a class-unknown term cluster 136, Classification module 114 uses the k-Nearest Neighbor classifier algorithm to rank the class-unknown cluster's neighbors among the term vectors, and uses the class labels of the k most similar neighbors to predict the class of the class-unknown term. The classes of these neighbors are weighted using the similarity of each neighbor to X, where similarity is measured by Euclidean distance or the cosine value between two document vectors. The cosine similarity is as follows:

$$sim(X, D_j) = \frac{\sum_{t_i \in (x \cap D_j)} x_i \times d_{ij}}{\|X\|_2 \times \|D_j\|_2}$$

where X is the test document, represented as a vector; $D_j$ is the jth training document; $t_i$ is a word shared by X and $D_j$; $x_i$ is the weight of term $t_i$ in X; $d_{ij}$ is the weight of term $t_i$ in document $D_j$; $\|X\|_2=\sqrt{x_1^2+x_2^2+x_3^2 \ldots}$ $\|X\|_2=\sqrt{x_1^2+x_2^2+x_3^2 \ldots}$ is the norm of X, and $\|D_j\|_2$ is the norm of $D_j$. A cutoff threshold is used to assign the new document to a known class.

In another implementation, a different statistical classification and machine learning technique (e.g., including regression models, Bayesian classifiers, decision trees, neural networks, and support vector machines) other than a nearest-neighbor classification technique is used to generate the trained STS classifier.

Classification module 114 submits low frequency of occurrence (FOO) query terms (see, high/low query terms portion of "other data" 132), one-by-one, to search engine 106. Responsive to receiving corresponding search results for each search engine submitted query, and using techniques already described, Classification module 114 extracts features such as a snippet description from each of the one or more retrieved Web page(s) identified in the search results. In this implementation, features are extracted from a first top-ranked Web page. These extracted features are represented in a respective portion of "other data" 132. In another implementation, features are extracted from a multiple top-ranked Web pages. For each retrieved and parsed Web page, Classification module 114 stores the following information in a respective record of extracted features: the snippet description, the search query used to obtain the retrieved Web page, and a Universal Resource Identifier (URI) of the retrieved Web page. Next, Classification module 114 tokenizes, reduces dimensionality, and normalizes extracted features 138 derived from low FOO query terms to generate another set of term vectors (i.e., STS-vectors 134).

Classification 114 clusters the term(s) in STS-vectors 134 into a respective set of term clusters 136, which are clusters based on low FOO query terms. This clustering operation is performed using the trained STS classifier 148, which as described above, was generated from high FOO query terms. Classification module 114 evaluates term(s) in view of these term clusters to identify and return a suggested term list 126 comprising these other terms to the end-user.

Exemplary Term Matching

In view of a configurable threshold, if confidence value 138 indicates that term(s) 122 should be accepted as irrelevant to site contents of URL 124, the bid input 120 is stored in bidding database 150 for resolution of subsequent queries 152 received from an end-user. For instance, responsive to receiving query 152 from an end-user searching for a Web page, term match module 116 edits the distance between the term(s) in query 150 and the term(s) from bidding database 150 to determine relevance of term(s) in query 152 to bid term(s) 122. In particular, term match module 116 determines relevance as follows:

$$\text{relevance}^* = \frac{\log(1 + \alpha(\beta \times fCommon + (1 - \beta) \times fDistance))}{\log(1 + \alpha)},$$

wherein fCommon represents the number of common term(s), and fDistance represents the number of times the bid term(s) 122 have been exchanged with term(s) of query 152.

An Exemplary Procedure

Figure 2:
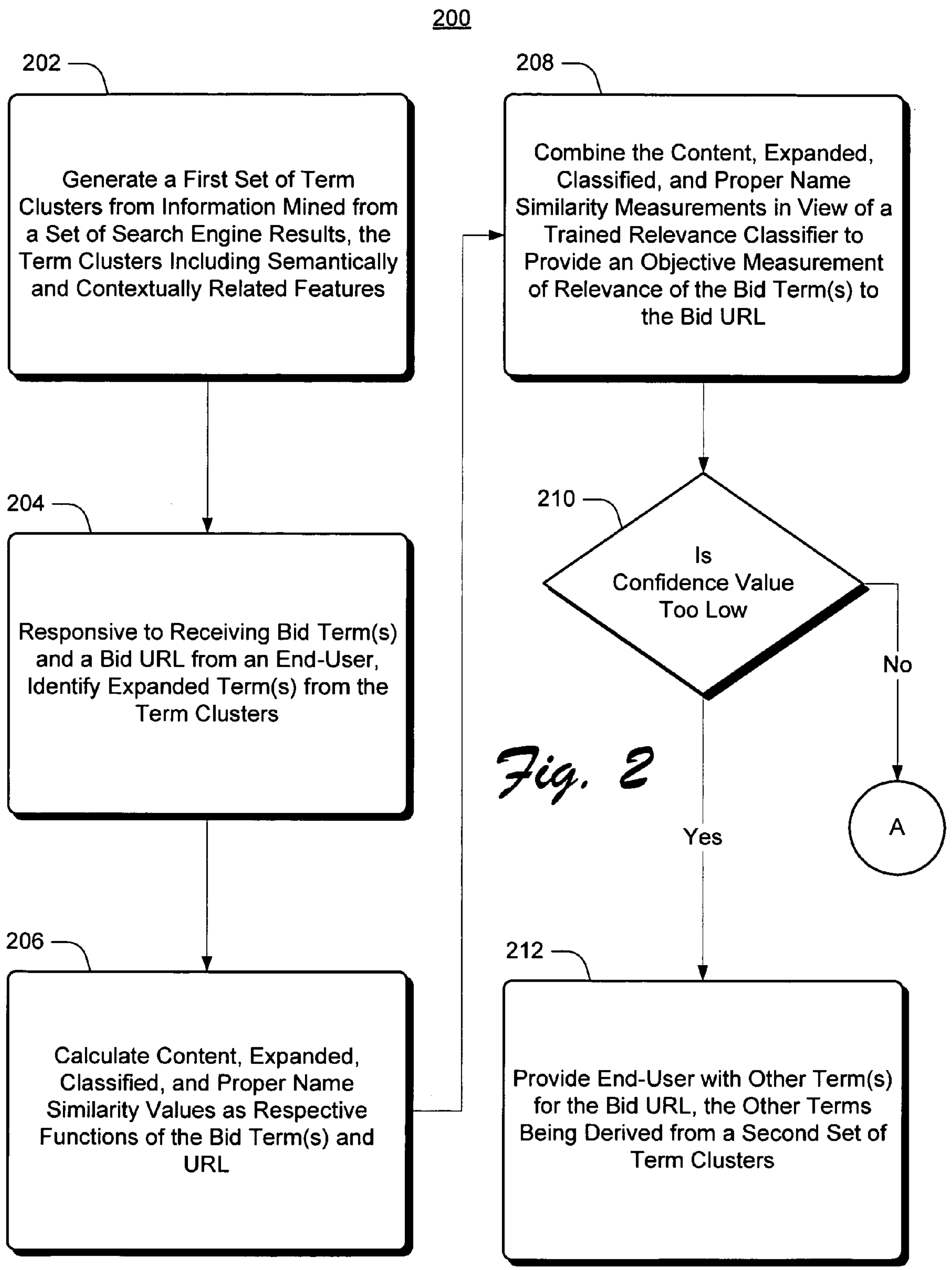
FIG. 2 illustrates an exemplary procedure for verifying relevance between terms and Web site contents.

FIG. 2 illustrates an exemplary procedure 200 for verifying relevance between terms and Web site contents. For purposes of discussion, operations of the procedure are discussed in relation to the components of FIG. 1. (All reference numbers begin with the number of the drawing in which the component is first introduced). At block 202, search term suggestion module 110 generates a first set of term clusters 136 from search engine 106 search results. For purposes of discussion, such search results are shown as a respective portion of "other data" 132. To obtain the search results, search term suggestion module 110 communicates high frequency of occurrence historical queries mined from query log 130. The term clusters 136 include snippet descriptions, corresponding search queries, and Web pages determined by the search term suggestion module 110 to be semantically and/or contextually related to the submitted high frequency of occurrence historical queries.

At block 204, responsive to editorial verification server 102 receiving bid input 120, including term(s) 122 and URL 124, search term suggestion module 110 identifies expanded terms from the term clusters 136 generated from the high frequency of occurrence historical query terms. Such expanded terms included terms that are semantically and/or contextually related to term(s) 122 and/or site content of the bid URL 124. Expanded terms are shown as suggested term list 126 of FIG. 1. At block 206, relevance verification module 112 calculates content, expanded, classified, and proper name similarity values (i.e., RV-similarity measurements 140) respectively from combinations of bid term(s) 122, bid URL 124, expanded terms of suggested term list 126, a trained similarity classifier 142, and/or a database of proper names. At block 208, relevance verification module 112 combines RV-similarity measurements 140 in view of a trained combined relevance classifier 144 and an accept/rejected threshold value (see, "other data" 132) to obtain a confidence value 138. Confidence value 138 provides an objective measurement of the relevance between the bid term(s) 122 and the bid URL 124.

At block 210, relevance verification module 112 determines whether the confidence value 138 is too low in view of the accept/rejected threshold. If so, the procedure continues at block 212. At block 212, classification module 114 generates suggested term list 126 from a second set of term clusters 136 based on search engine 106 results to low FOO historical queries and a classifier trained on the first set of term clusters 136. Term(s) of the suggested term list 126 are determined by classification module 114 to be semantically and/or contextually similar to site contents associated with the bid URL 124. For purposes of illustration, the classifier is shown as STS classifier 148. In this example, suggested term list 126 is shown as being communicated as a message 146 to an end-user for evaluation.

Figure 3:
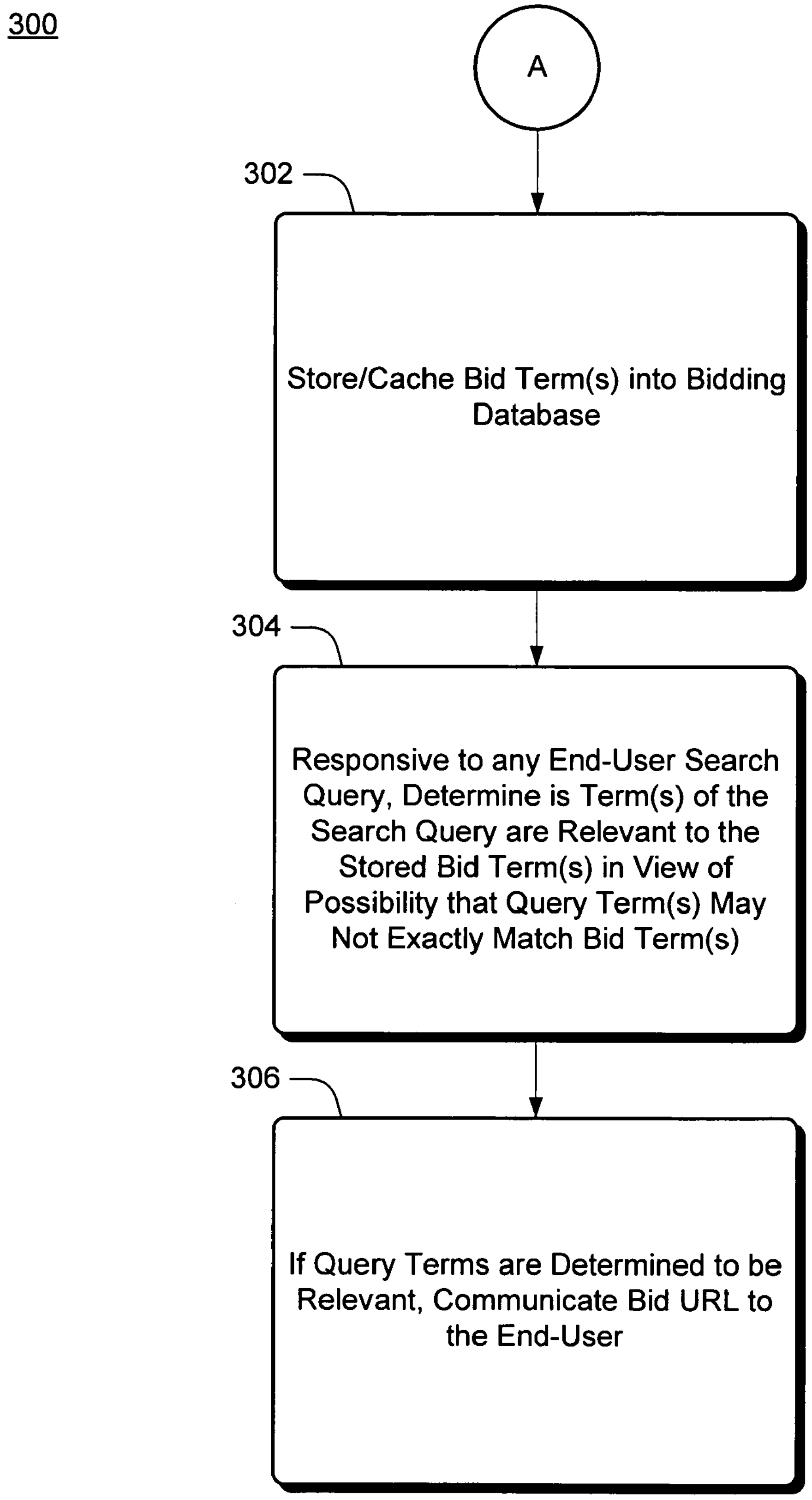
FIG. 3 illustrates an exemplary procedure for verifying relevance between terms and Web site contents. In particular.

At block 208, if relevance verification module 112 determines that the confidence value 138 is acceptable (not too low in view of the accept/rejected threshold), the procedure continues at block 302 of FIG. 3, as indicated by on-page reference "A".

FIG. 3 illustrates an exemplary procedure 300 for verifying relevance between terms and Web site contents. In particular, FIG. 3 is a continuation of the exemplary operations of FIG. 2. At block 302, relevance verification module 112 stores/caches the bid term(s) 122 and bid URL 124 into bidding database 150. At block 304, Responsive to receipt by editorial verification server 102 of any end-user query 152, term matching module 116 determines if terms of the search query 152 are relevant to the term(s) 122 stored in the bidding database 150 in view of a possibility that the query terms may not exactly match the bid term(s) 122. At block 306, if the term(s) of query 152 are determined to be relevant to bid term(s) 122, editorial verification server 102 communicates the corresponding bid URL 124 to the end-user as a search result.

An Exemplary Operating Environment

Figure 4:
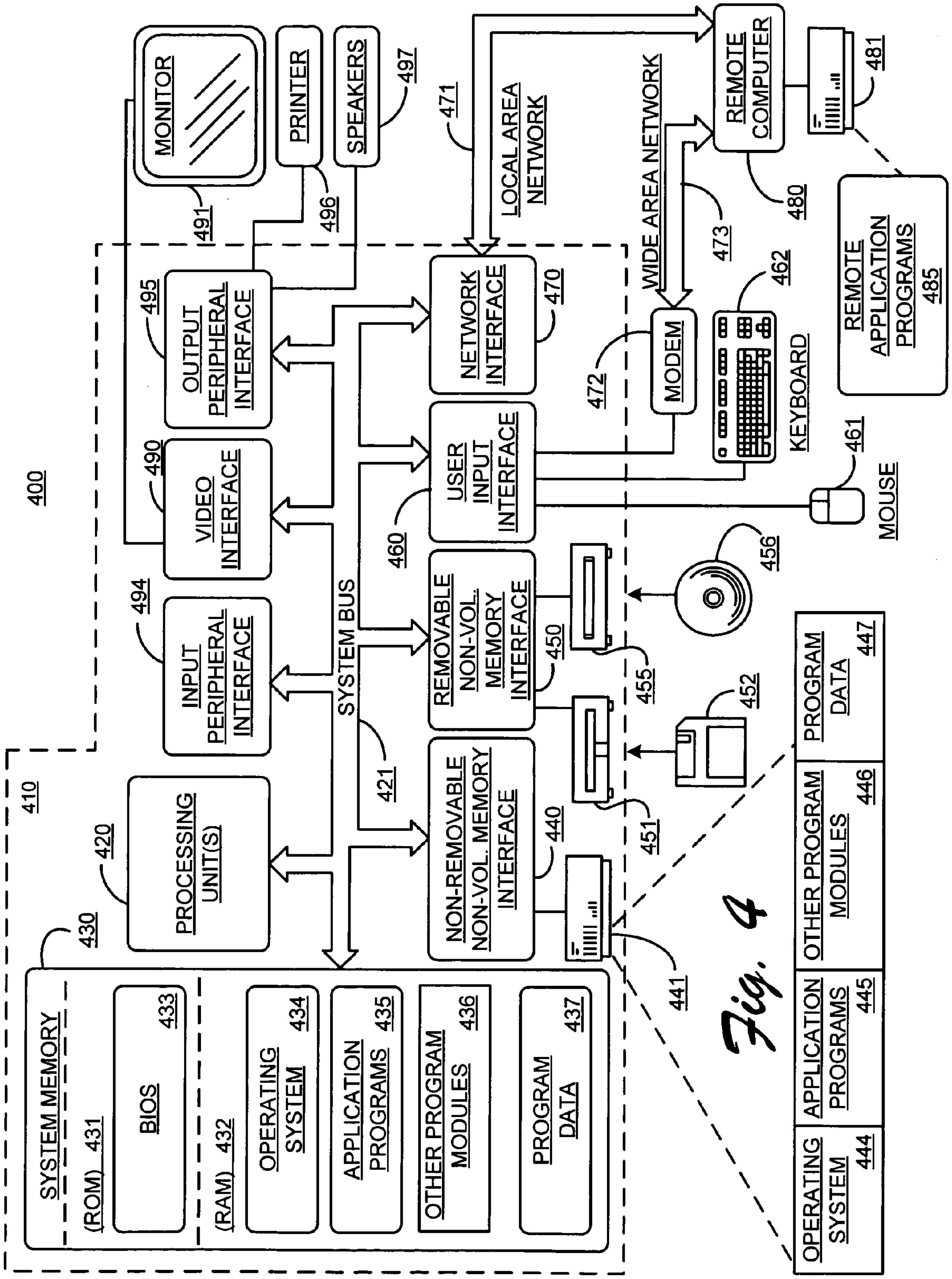
FIG. 4 shows an exemplary suitable computing environment on which the subsequently described systems, apparatuses and methods for verifying relevance between terms and Web site contents may be fully or partially implemented.

FIG. 4 illustrates an example of a suitable computing environment 400 on which the system 100 of FIG. 1 and the methodology of FIGS. 2 and 3 for verifying relevance between terms and Web site contents may be fully or partially implemented. Exemplary computing environment 400 is only one example of a suitable computing environment and is not intended to suggest any limitation as to the scope of use or functionality of systems and methods the described herein. Neither should computing environment 400 be interpreted as having any dependency or requirement relating to any one or combination of components illustrated in computing environment 400.

The methods and systems described herein are operational with numerous other general purpose or special purpose computing system environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 4, an exemplary system for verifying relevance between terms and Web site contents includes a general purpose computing device in the form of a computer 410. The following described aspects of computer 410 are exemplary implementations of client computing device PSS server 102 (FIG. 1) and/or client computing device 106. Components of computer 410 may include, but are not limited to, processing unit(s) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 435, other program modules 436, and program data 437. In one implementation, application programs 435 comprise program modules 108 of FIG. 1. In this same scenario, program data 437 comprises program data 128 of FIG. 1.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that they are at least different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 operates in a networked environment using logical connections to one or more remote computers, such as a remote computer 480. The remote computer 480 may be a personal computer, a server, a router, a network PC, a peer device or other common network node, and as a function of its particular implementation, may include many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 485 as residing on memory device 481. The network connections shown are exemplary and other means of establishing a communications link between the computers may be used.

CONCLUSION

Although the systems and methods for verifying relevance between terms and Web site contents have been described in language specific to structural features and/or methodological operations or actions, it is understood that the implementations defined in the appended claims are not necessarily limited to the specific features or actions described. Accordingly, the specific features and actions are disclosed as exemplary forms of implementing the claimed subject matter.

The invention claimed is:

1. A method for verifying relevance between terms and Web site contents, the method comprising:

retrieving site contents from a bid URL;

formulating expanded term(s) comprising at least one of semantically or contextually related to bid term(s), which are mined from a search engine in view of high-frequency of occurrence historical query terms;

generating content similarity and expanded similarity measurements from respective combinations of the bid term(s), the site contents, and the expanded terms, wherein the similarity measurements indicate relatedness between respective ones of the bid term(s), site contents, or expanded terms;

calculating category similarity measurements between the expanded terms and the site contents in view of a similarity classifier, wherein the similarity classifier has been trained from mined web site content associated with directory data;

calculating a confidence value from combined ones of multiple similarity measurements, wherein the combined ones comprise content, expanded, and category similarity measurements, wherein the confidence value provides objective measure of relevance between the bid term(s) and the site contents;

analyzing the confidence value to identify the bid term(s); and using the bid term(s) identified to increase traffic to a site to obtain site exposure;

wherein generating the category similarity measurements further comprises:

extracting features from Web site content associated with the directory data, the features comprising a combination of at least one of title, metadata, body, hypertext link(s), visual feature(s), and summarization by page layout analysis information;

reducing dimensionality of the features via feature selection;

categorizing the features via a classifier model to generate the similarity classifier;

generating respective term vectors from the bid term(s), the site contents, and the expanded terms; and calculating similarity between the respective term vectors as a function of the similarity classifier to determine the category similarity measurements.

2. A method as recited in claim 1, wherein the similarity classifier is based on a statistical n-gram based naïve Bayesian (N-Gram), a naïve Bayesian (NB), support vector machine (SVM), a nearest neighbor (KNN), a decision tree, a co-training, or a boosting classification model.

3. A method as recited in claim 1, wherein formulating the expanded terms further comprises generating term clusters from term vectors based on calculated term similarity, the term vectors being generated from historical queries, each historical query having a high frequency of occurrence, the term clusters comprising the expanded terms.

4. A method as recited in claim 1, wherein generating the content similarity measurements further comprise generating respective term vectors from the bid term(s) and the site contents, and calculating similarity between the respective term vectors to determine direct similarity between the bid term(s) and the site contents.

5. A method as recited in claim 1, wherein generating the expanded similarity measurements further comprises:

generating respective term vectors from the bid term(s), the site contents, and the expanded terms; and calculating similarity between the respective term vectors to determine the expanded similarity measurements between the bid term(s) and the site contents.

6. A method as recited in claim 1, wherein calculating the confidence value further comprises:

training a combined relevance classifier with data of the form <term(s), Web site content, accept/reject> in view of an accept/reject threshold;

generating relevance verification similarity measurement (RSVM) feature vectors from the content, expanded, and category similarity measurements; and mapping multiple scores from the RSVM feature vectors to the confidence value via the combined relevance classifier.

7. A method as recited in claim 1, wherein the method further comprises:

caching the bid term(s) and bid URL into a bidding database;

responsive to receipt of an search query, determining if terms of the search query are relevant to the bid term(s) in view of a possibility that the terms of the search query may not exactly match the bid term(s); and if the term(s) of search query are determined to be relevant to the bid term(s), communicating the bid URL to the end-user.

8. A method as recited in claim 1, wherein the method further comprises:

determining proper name similarity measurements from the bid term(s) and site contents, the proper name similarity measurements indicating relatedness between any proper name(s) detected in the bid term(s) and the site contents in view a set of proper names; and wherein the combined ones of multiple similarity measurements comprise the proper name similarity measurements.

9. A method as recited in claim 8, wherein determining the proper name similarity measurements further comprises:

responsive to detecting a proper name comprising at least one of the bid term(s) or the site contents, calculating a proper name similarity score as:

Prop_Sim(term, site contents), wherein Prop_Sim(term, site contents) equals: one (1) when a term contains a proper name P, and site contents contains a comfortable proper name Q; zero (0) when a term contains a proper name P, and site contents contains only unconformable proper name(s); or, zero-point-five (0.5).

10. A method as recited in claim 1, wherein the method further comprises:

determining that the confidence value is relatively low; and responsive to the determining, identifying one or more other terms comprising at least one of,semantically or contextually related to the bid URL.

11. A method as recited in claim 10, wherein identifying further comprises:

generating a set of term clusters from term vectors based on calculated term similarity, the term vectors being generated from search engine results of submitted historical queries, each historical query having a relatively low frequency of occurrence as compared to other query terms in a query log; and evaluating the site contents in view of term(s) specified by the term clusters to identify at least one or more semantically or contextually related terms, the terms being the one or more other terms.

12. A computer-readable storage medium comprising computer-executable instructions for verifying relevance between terms and Web site contents, the computer-executable instructions comprising instructions for:

retrieving site contents from a bid URL;

formulating expanded term(s) comprising at least one of semantically or contextually related to bid term(s), which are mined from a search engine in view of high-frequency of occurrence historical query terms;

generating content similarity and expanded similarity measurements from respective combinations of the bid term(s), the site contents, and the expanded terms, wherein the similarity measurements indicate relatedness between respective ones of the bid term(s), site contents, or expanded terms;

calculating category similarity measurements between the expanded terms and the site contents in view of a similarity classifier, wherein the similarity classifier has been trained from mined web site content associated with directory data;

calculating a confidence value from combined ones of multiple similarity measurements, wherein the combined ones comprise content, expanded, and category similarity measurements;

providing an objective measure of relevance between the bid term(s) and the site contents as indicated by the confidence value;

analyzing the confidence value to identify the bid term(s); and using the bid term(s) identified to increase traffic to a site to obtain site exposure;

wherein the computer-executable instructions for generating the category similarity measurements further comprise instructions for:

extracting features from Web site content associated with the directory data, the features comprising a combination at least one of title, metadata, body, hypertext link(s), visual feature(s), and summarization by page layout analysis information; reducing dimensionality of the features via feature selection; categorizing the features via a classifier model to generate the similarity classifier;

generating respective term vectors from the bid term(s), the site contents, and the expanded terms; and calculating similarity between the respective term vectors as a function of the similarity classifier to determine the category similarity measurements.

13. A computer-readable storage medium as recited in claim 12, wherein the similarity classifier is based on a statistical n-gram based naïve Bayesian (N-Gram), a naïve Bayesian (NB), support vector machine (SVM), a nearest neighbor (KNN), a decision tree, a co-training, or a boosting classification model.

14. A computer-readable storage medium as recited in claim 12, wherein the computer-executable instructions for formulating the expanded terms further comprise instructions for generating term clusters from term vectors based on calculated term similarity, the term vectors being generated from historical queries, each historical query having a high frequency of occurrence, the term clusters comprising the expanded terms.

15. A computer-readable storage medium as recited in claim 12, wherein the computer-executable instructions for generating the content similarity measurements further comprise instructions for generating respective term vectors from the bid term(s) and the site contents, and calculating similarity between the respective term vectors to determine direct similarity between the bid term(s) and the site contents.

16. A computer-readable medium storage as recited in claim 12, wherein the computer-executable instructions for generating the expanded similarity measurements further comprise instructions for:

generating respective term vectors from the bid term(s), the site contents, and the expanded terms; and calculating similarity between the respective term vectors to determine the expanded similarity measurements between the bid term(s) and the site contents.

17. A computer-readable storage medium as recited in claim 12, wherein the computer-executable instructions for calculating the confidence value further comprise instructions for:

training a combined relevance classifier with data of the form <term(s), Web site content, accept/reject> in view of an accept/reject threshold;

generating relevance verification similarity measurement (RSVM) feature vectors from the content, expanded, and category similarity measurements; and mapping multiple scores from the RSVM feature vectors to the confidence value via the combined relevance classifier.

18. A computer-readable storage medium as recited in claim 12, wherein the computer-executable instructions further comprise instructions for:

caching the bid term(s) and bid URL into a bidding database;

responsive to receipt of an search query, determining if terms of the search query are relevant to the bid term(s) in view of a possibility that the terms of the search query may not exactly match the bid term(s); and if the term(s) of search query are determined to be relevant to the bid term(s), communicating the bid URL to the end-user.

19. A computer-readable storage medium as recited in claim 12, wherein the computer-executable instructions further comprise instructions for:

determining proper name similarity measurements from the bid term(s) and site contents, the proper name similarity measurements indicating relatedness between any proper name(s) detected in the bid term(s) and the site contents in view a set of proper names; and wherein the combined ones of multiple similarity measurements comprise the proper name similarity measurements.

20. A computer-readable storage medium as recited in claim 19, wherein the computer-executable instructions for determining the proper name similarity measurements further comprise instructions for:

responsive to detecting a proper name comprising at least one of the bid term(s) or the site contents, calculating a proper name similarity score as:

Prop_Sim(term, site contents) and wherein Prop_Sim(term, site contents) equals: one (1) when a term contains a proper name P, and site contents contains a conformable proper name Q; zero (0) when a term contains a proper name P, and site contents contains only unconformable proper name(s); or, zero-point-five (0.5).

21. A computer-readable storage medium as recited in claim 12, wherein the computer-executable instructions further comprise instructions for:

determining that the confidence value is relatively low; and responsive to the determining, identifying one or more other terms that are semantically and/or contextually related to the bid URL.

22. A computer-readable storage medium as recited in claim 21, wherein the computer executable instructions for identifying further comprise instructions for:

generating a set of term clusters from term vectors based on calculated term similarity, the term vectors being generated from search engine results of submitted historical queries, each historical query having a relatively low frequency of occurrence as compared to other query terms in a query log; and evaluating the site contents in view of term(s) specified by the term clusters to identify one or more semantically and/or contextually related terms, the terms being the one or more other terms.

23. A computing device for verifying relevance between terms and Web site contents, the computing device comprising:

a processor; and a memory coupled to the processor, the memory comprising computer-program instructions executable by the processor for:

retrieving site contents from a bid URL;

formulating expanded term(s) comprising at least one of semantically or contextually related to bid term(s), generating content similarity and expanded similarity measurements from respective combinations of the bid term(s), the site contents, and the expanded terms, wherein the similarity measurements indicate relatedness between respective ones of the bid term(s), site contents; or expanded terms;

calculating a confidence value from combined ones of multiple similarity measurements, wherein the combined ones comprise content, expanded, and category similarity measurements;

providing an objective measure of relevance between the bid term(s) and the site contents as indicated by the confidence value;

analyzing the confidence value to identify the bid term(s); and using the bid term(s) identified to increase traffic to a site to obtain site exposure;

wherein the computer-executable instructions for generating the category similarity measurements further comprise instructions for:

extracting features from web site content associated with the directory data, the features comprising a combination of at least one of title, metadata, body, hypertext link(s), visual feature(s), and summarization by page layout analysis information;

reducing dimensionality of the features via feature selection;

categorizing the features via a classifier model to generate the similarity classifier;

generating respective term vectors from the bid term(s), the site contents, and the expanded terms; and calculating similarity between the respective term vectors as a function of the similarity classifier to determine the category similarity measurements.

24. A computing device as recited in claim 23, wherein the similarity classifier is based on a statistical n-gram based naïve Bayesian (N-Gram), a naïve Bayesian (NB), support vector machine (SVM), a nearest neighbor (KNN), a decision tree, a co-training, or a boosting classification model.

25. A computing device as recited in claim 23, wherein the computer-executable stored instructions for formulating the expanded terms further comprise instructions for generating term clusters from term vectors based on calculated term similarity, the term vectors being generated from historical queries, each historical query having a high frequency of occurrence, the term clusters comprising the expanded terms.

26. A computing device as recited in claim 23, wherein the computer-executable stored instructions for generating the content similarity measurements further comprise instructions for generating respective term vectors from the bid term(s) and the site contents, and calculating similarity between the respective term vectors to determine direct similarity between the bid term(s) and the site contents.

27. A computing device as recited in claim 23, wherein the computer-executable stored instructions for generating the expanded similarity measurements further comprise instructions for:

generating respective term vectors from the bid term(s), the site contents, and the expanded terms; and calculating similarity between the respective term vectors to determine the expanded similarity measurements between the bid term(s) and the site contents.

28. A computing device as recited in claim 23, wherein the computer-executable stored instructions for calculating the confidence value further comprise instructions for:

training a combined relevance classifier with data of the form <term(s), Web site content, accept/reject> in view of an accept/reject threshold;

generating relevance verification similarity measurement (RSVM) feature vectors from the content, expanded, and category similarity measurements; and mapping multiple scores from the RSVM feature vectors to the confidence value via the combined relevance classifier.

29. A computing device as recited in claim 23, wherein the computer-executable stored instructions further comprise instructions for:

determining proper name similarity measurements from the bid term(s) and site contents, the proper name similarity measurements indicating relatedness between any proper name(s) detected in the bid term(s) and the site contents in view a set of proper names; and wherein the combined ones of multiple similarity measurements comprise the proper name similarity measurements.

30. A computing device as recited in claim 29, wherein the computer-executable stored instructions for determining the proper name similarity measurements further comprise instructions for:

responsive to detecting a proper name comprising at least one of the bid term(s) or the site contents, calculating a proper name similarity score as: Prop_Sim(term, site contents) and wherein Prop_Sim(term, site contents) equals: one (1) when a term contains a proper name P, and site contents contains a conformable proper name Q; zero (0) when a term contains a proper name P, and site contents contains only unconformable proper name(s); or, zero-point-five (0.5).

31. A computing device as recited in claim 23, wherein the computer-executable stored instructions further comprise instructions for:

determining that the confidence value is relatively low; and responsive to the determining, identifying one or more other terms comprising at least one of semantically or contextually related to the bid URL.

32. A computing device as recited in claim 31, wherein the computer-executable stored instructions for identifying further comprise instructions for:

generating a set of term clusters from term vectors based on calculated term similarity, the term vectors being generated from search engine results of submitted historical queries, each historical query having a relatively low frequency of occurrence as compared to other query terms in a query log; and evaluating the site contents in view of term(s) specified by the term clusters to identify at least one or more semantically or contextually related terms, the terms being the one or more other terms.

33. A computing device for verifying relevance between terms and Web site contents, the computing device comprising:

retrieving means to obtain site contents from a bid URL;

formulating means to identify expanded term(s) comprising at least one of semantically or contextually related to bid term(s), generating means to create content similarity and expanded similarity measurements from respective combinations of the bid term(s), the site contents, and the expanded terms, wherein the similarity measurements indicating indicate relatedness between respective ones of the bid term(s), site contents, or expanded terms;

calculating means to determine category similarity measurements between the expanded terms and the site contents in view of a similarity classifier, wherein the similarity classifier has been trained from mined web site content associated with directory data;

calculating means to generate a confidence value from combined ones of multiple similarity measurements, wherein the combined ones comprise content, expanded, and category similarity measurements, wherein the confidence value provides an objective measure of relevance between the bid term(s) and the site contents;

analyzing means to analyze the confidence value to identify the bid term(s); and increasing means to increase traffic to a site by using the bid term(s) identified;

wherein the generating means further comprise:

extracting means to obtain features from Web site content associated with the directory data, the features comprising a combination of at least one of title, metadata, body, hypertext link(s), visual feature(s), and summarization by page layout analysis information;

reducing means to lessen dimensionality of the features via feature selection;

categorizing means to organize the features via a classifier model to generate the similarity classifier;

generating means to create respective term vectors from the bid term(s), the site contents, and the expanded terms; and calculating means to identify similarity between the respective term vectors as a function of the similarity classifier to determine the category similarity measurements.

34. A computing device as recited in claim 33, wherein the computer formulating means further comprise generating means to create term clusters from term vectors based on calculated term similarity, the term vectors being generated from historical queries, each historical query having a high frequency of occurrence, the terms clusters comprising the expanded terms.

35. A computing device as recited in claim 33, wherein the generating means further comprise creating means to generate respective term vectors from the bid term(s) and the site contents, and calculating similarity between the respective term vectors to determine direct similarity between the bid term(s) and the site contents.

36. A computing device as recited in claim 33, wherein the generating means further comprise:

creating means to generate respective term vectors from the bid term(s), the site contents, and the expanded terms; and calculating means to determine similarity between the respective term vectors to determine the expanded similarity measurements between the bid term(s) and the site contents.

37. A computing device as recited in claim 33, wherein the calculating means further comprise:

training means to train a combined relevance classifier with data of the form <term(s), Web site content, accept/reject> in view of an accept/reject threshold;

generating means to generate relevance verification similarity measurement (RSVM) feature vectors from the content, expanded, and category similarity measurements; and mapping means to correlate multiple scores from the RSVM feature vectors to the confidence value via the combined relevance classifier.

38. A computing device as recited in claim 33, wherein the computing device further comprises:

determining means to determine proper name similarity measurements from the bid term(s) and site contents, the proper name similarity measurements indicating relatedness between any proper name(s) detected in the bid term(s) and the site contents in view a set of proper names; and wherein the combined ones of multiple similarity measurements comprise the proper name similarity measurements.

39. A computing device as recited in claim 38, wherein the determining means to determine the proper name similarity measurements further comprise responsive to detecting a proper name comprising at least one of the bid term(s) or the site contents, calculating means to calculate a proper name similarity score.

40. A computing device as recited in claim 33, wherein the computing device further comprises:

determining means to determine that the confidence value is relatively low; and responsive to the determining, identifying means to identify one or more other terms comprising at least one of semantically or contextually related to the bid URL.

41. A computing device as recited in 40, wherein the identifying means further comprise:

generating means to generate a set of term clusters from term vectors based on calculated term similarity, the term vectors being generated from search engine results of submitted historical queries, each historical query having a relatively low frequency of occurrence as compared to other query terms in a query log; and evaluating means to evaluate the site contents in view of lean(s) specified by the term clusters to identify at least one or more semantically or contextually related terms, the terms being the one or more other terms.

* * * * *